No. 778,477. Patented December 27, 1904.

UNITED STATES PATENT OFFICE.

KARL ELBEL, OF BIEBRICH, GERMANY, ASSIGNOR TO THE FIRM OF KALLE AND COMPANY, OF BIEBRICH, GERMANY.

MONOCHLORO ALPHA-NAPHTHOL AND PROCESS OF MAKING SAME.

SPECIFICATION forming part of Letters Patent No. 778,477, dated December 27, 1904.

Application filed October 5, 1904. Serial No. 227,291.

*To all whom it may concern:*

Be it known that I, KARL ELBEL, a subject of the King of Prussia, Emperor of Germany, residing at Biebrich, Germany, have invented certain new and useful Improvements in the Manufacture of Monochloro-Alpha-Naphthol, of which the following is a specification.

My invention relates to the manufacture of a new monochloro-alpha-naphthol by acting on the alkali salts of alpha-naphthol with hypochlorites—for instance, sodium hypochlorite—in molecular proportion. The new monochloro-alpha-naphthol is precipitated from the so-obtained reaction product by means of an organic or mineral acid.

I am aware that various monochloro-alpha-naphthols have been formerly prepared and have been described in literature. From these my new product differs in its melting-point. It is a homogeneous body containing the chlorin atom apparently in ortho position to the hydroxyl groups.

In the following I give an example according to which the new product may be obtained; but my invention is not limited to the proportions or other conditions mentioned therein.

14.4 kilos alpha-naphthol are dissolved in about one hundred and fifty liters of water by means of twelve kilos caustic-soda lye of 40° Baumé. To this solution I add slowly, stirring well and maintaining by addition of ice a temperature near the freezing point, one hundred liters hypochlorite solution, which contains 7.5 kilos of NaOCl, besides an excess of caustic soda. After having continued the stirring for about half an hour I acidulate the liquid by means of hydrochloric acid. The monochloro-alpha-naphthol at first separates out in an oily state; but it soon solidifies, forming an almost white crystalline body, which may be further purified by distillation in a vacuum or by distillation with overheated steam or by crystallization from ligroin. In a completely pure state it consists of white prismatic crystals, melting at 64° to 65° centigrade, having a characteristic pungent smell and being very easily soluble in benzene, alcohol, and ether.

The new monochloro-alpha-naphthol may be combined with diazo bodies forming azo colors, and it yields indophenols when oxidized together with paradiamins or para-amidophenols.

What I claim is—

1. As a new process the manufacture of monochloro-alpha-naphthol by acting on solutions of alkali salts of alpha-naphthol with hypochlorites in molecular proportion and by acidulating the reaction product.

2. As a new product the monochloro-alpha-naphthol obtainable by acting on solutions of alkali salts of alpha-naphthol with hypochlorites and by subsequently acidulating the reaction product, which consists in the pure state of white prismatic crystals melting at 64° to 65° centigrade, having a characteristic pungent smell and being very easily soluble in benzene, alcohol and ether.

In testimony whereof I have signed my name to this specification in the presence of two subscribing witnesses.

KARL ELBEL.

Witnesses:
   IGNAZ ROSENBERG,
   JEAN GRUND.